(12) United States Patent
Yamadera et al.

(10) Patent No.: US 7,376,577 B1
(45) Date of Patent: May 20, 2008

(54) SYSTEM FOR MANAGING PROCESS AND MAN-HOUR

(75) Inventors: Shinya Yamadera, Kawasaki (JP);
Nobuo Iwamura, Kawasaki (JP);
Naofumi Kutsumi, Kawasaki (JP);
Tadashi Kinoshita, Kawasaki (JP);
Teruo Sakamoto, Kawasaki (JP); Kenji Mitsuishi, Kawasaki (JP); Tsutomu Kaneko, Kawasaki (JP); Shin Fujita, Kawasaki (JP); Yuichiro Watanabe, Kawasaki (JP)

(73) Assignee: Mitsubishi Automotive Engin. Co., Ltd., Kanagawa (JP)

( * ) Notice: Subject to any disclaimer, the term of this patent is extended or adjusted under 35 U.S.C. 154(b) by 0 days.

(21) Appl. No.: 09/763,942

(22) PCT Filed: Aug. 30, 1999

(86) PCT No.: PCT/JP99/04673

§ 371 (c)(1),
(2), (4) Date: Jun. 1, 2001

(87) PCT Pub. No.: WO00/13116

PCT Pub. Date: Mar. 9, 2000

(30) Foreign Application Priority Data

Aug. 31, 1998 (JP) ............................ 10-262441
Mar. 31, 1999 (JP) ............................ 11-090870

(51) Int. Cl.
*G06F 17/60* (2006.01)
(52) U.S. Cl. ............................ 705/9; 705/7
(58) Field of Classification Search .................. 705/7, 705/8, 9
See application file for complete search history.

(56) References Cited

U.S. PATENT DOCUMENTS 5,709,410 A * 1/1998 Reeves, Jr. .................. 283/67

(Continued)

FOREIGN PATENT DOCUMENTS

JP          8-234977          9/1996

(Continued)

OTHER PUBLICATIONS

Technical Advisory; "Specification Conformity Analysis"; Jun. 23, 1989; Department of Transportation Federal Highway Administration; pp. 1-9.*

(Continued)

*Primary Examiner*—Romain Jeanty
(74) *Attorney, Agent, or Firm*—Sughrue Mion Pllc.

(57) ABSTRACT

Apparatuses and methods for managing a process that include schedule management, quality, and process management features. Information is stored on an authorized person in charge and a conformity standard for the work to be managed. From this information, a managing method of the work to be managed from among a plurality of managing methods classified in advance is determined. Processes are determined for each management method, and a time limit determined by the authorized person in charge for each managed process. Adherence standards related to the managed processes are included, as well as records made of the process information including the performance quality of the managed process.

11 Claims, 8 Drawing Sheets

| Completion plan |
|---|
| Completion actual result |
| Process |
| The contents of operating |
| Quality record number |
| Person in charge |
| Standard record |
| Standard number |

U.S. PATENT DOCUMENTS 5,765,140 A * 6/1998 Knudson et al. ................ 705/9
6,023,702 A * 2/2000 Leisten et al. .............. 707/100
6,161,113 A * 12/2000 Mora et al. ................. 715/505
6,275,812 B1 * 8/2001 Haq et al. ..................... 705/11
6,308,164 B1 * 10/2001 Nummelin et al. ............ 705/9

FOREIGN PATENT DOCUMENTS

WO      WO 9418620 A1 * 8/1994

OTHER PUBLICATIONS

Patent Abstracts of Japan 08-23497 Sep. 13, 1996.
Yoshifumi Sakai and Katsumi Hotta, "Method for structuring a software quality management system", NTT R & D, vol. 45, No. 3, Mar. 10, 1996, pp. 237-246.
Andy Lin, "What is work flow? Its usage and effects", Back Office Magazine, vol. 2, No. 4, Apr. 1, 1998, pp. 132-136.
"Groupware promoting internet/intranet connection", Nikkei Computer, No. 412, Mar. 3, 1997, pp. 208-212.

* cited by examiner

| Classification | | item | note |
|---|---|---|---|
| Whole (group sum total) | | Staff<br>Operation days<br>Average overtime work<br>Annual-paid-holidays<br>acquisition<br>Indirect time<br>In-house man day<br>Subcontract man day<br>The total man day | |
| Order-received decision business | PMS unit | In-house man day<br>Subcontract man day<br>Sum total | data is included. |
| | Outside of PMS | In-house man day<br>Subcontract man day<br>Sum total | data is included. |
| Undetermned | | In-house man day<br>Subcontract man day<br>Sum total | |

Fig. 6

| Item | | schedule | actual result | note |
|---|---|---|---|---|
| Whole [the group sum total] | Staff (number) | ○a | ○ | Sign |
| | Operation days(Sun.) | ○b | — | ○ : Data entry<br>● : Automatic total |
| | Average overtime work (H/person) | ○c | ● | |
| | annual-paid-holidays acquisition(Sun.) | ○d | ○ | ← : This left |
| | Indirect time (H) | ○e | ● | — : It does not correspond. |
| | In-house man day (H) | ●f | ● | Note:<br>* mark |
| | Subcontract man day (H) | ●g | ● | The indirect time (education etc.) is filled in as a direct time appropriation staff.<br>(Reference) Formula |
| | The total man day (H) | ○h | ● | |
| Each PMS unit | In-house man day (H) | ○l | | |
| | Subcontract man day (H) | ○j | | |
| | Sum total (H) | ●k | ● | |
| Outside of PMS (according to A1 and A2) | In-house man day (H) | ○l | ○ | |
| | Subcontract man day (H) | ○m | ○ | |
| | Sum total (H) | ●n | ● | |
| A part for undecidedness | In-house man day (H) | ●o | — | |
| | Subcontract man day (H) | ●p | — | |
| | Sum total (H) | ●q | — | |

Caluculation formula
$F=8[(a \times b)-d]+(a \times c)-d$
$g=h-f \quad m=j+k \quad n=f-\Sigma j \quad p=g-\Sigma k$
$q=n+p$

SYSTEM FOR MANAGING PROCESS AND MAN-HOUR

BACKGROUND OF THE INVENTION

1. Field of the Invention

Apparatuses and methods consistent with the invention relate to a management system of a process and a man-day, including schedule management, a quality control, and process management.

2. Description of the Related Art

As conventional technology, business management systems including schedule management and process control are disclosed as discussed below.

(1) Provisional Publication No. Hei 4-363758 economizes a bank loan receptionist business, and is related to an on-line loan operating registration system which uses an application registration processing part, a reference processing part, a loan request-for-managerial-decision creation part, a request-for-decision registration processing part, and a list creation processing part as a composition element for the purpose of reducing errors.

(2) Provisional Publication No. Hei 5-101080 facilitates adjustment work normally performed by an operator, and is configured so that an electronic check is issued based on a progress of work. The system transmits an electronic check according to the time set as the schedule for the purpose of improvement in operating efficiency.

(3) Provisional Publication No. Hei 6-4838 is related to a database management system, which forbids accessing inaccurate data.

(4) Provisional Publication No. Hei 6-35767 is related to a system which accelerates the reference and processing to a database by changing an inquiry into an inquiry to a composition table, by the definition of a VIEW table, when the table, which a user requests, is the VIEW table.

(5) In Provisional Publication No. Hei 8-101785, a document data registration means registers document managed data with the created document data, a document data audit means performs a seal of approval based on the audit person and its audit route of the request determined with document managed data, a management number grant means, a document data distribution means, and a receipt managed data addition means are related to the document management system carried out as composition about a document and a data management system.

(6) Provisional Publication No. Hei 8-137852 displays a share window, displays an icon, and displays an individual window etc., about the system, which manages common writing of a document, on the screen of a workstation. In this system, two or more files, which store a common writing document, are stored in the file server, and this file is managed also as an individual document at the same time it is managed as a share document. By using a schedule table, an editor transmits a writing schedule to each writer, and it is used with a document management system, which manages adjustment of a schedule, and progress among common writers.

In Provisional Publication No. Hei 8-101785, a composition element is used as a document data audit means to perform a seal of approval based on an audit person and its audit route of the request is determined with document managed data. However, this process is greatly different than in the present invention. In the present invention, apparatuses and methods include a time for delivery, especially in connection with quality. Moreover, conventionally, the present condition is that paper management of standard-lives system management of ISO, execution record, and the quality record is carried out, and a synthetic business management system corresponding to [it is paperless and] ISO like this invention does not exist until now. Moreover, the conventional man-hour control system has been carried out by displaying the accumulation table of a staff, operation days, and the amount of business in the time series. And the total table and the display figures were created individually, and it is so limited. For example, in a precedence patent application, the following invention is disclosed about the man-hour control system of the conventional technology.

(1) The basic pattern and work list data with which Provisional Publication No. Sho 63-97443 "process control equipment" was stored in the memory part—being based—a plan, an actual result, and the progress situation of a process—as the network of 1—terminal equipment and printing, and illustrating—it is related with equipment at the process control equipment which indicates by the output. However, the man-hour control of this design is not carried out using an in-house intranet.

(2) Utility Patent Provisional Publication No. Sho 63-9051 relates to construction schedule plan equipment, which has the information registration part of the work which constitutes construction, and an actual result registration part, a resources total part and a work schedule change part. However, this design does not perform man-hour control using an in-house intranet, either.

(3) Provisional Publication No. Hei4-176546, relates to "a progress management system" characterized by outputting an alarm, when the production output actual result is less than the amount of target outputs. However, this design does not perform man-hour control using an in-house intranet, either.

(4) In Provisional Publication No. Hei5-12300, the actual result display method in "semiconductor equipment manufacture" includes an actual result report step for each piece of equipment in the manufacture line of semiconductor equipment, the step which carries out data processing, and the step which displays the degree of target achievement in diagram. However, this design does not perform man-hour control using an in-house intranet, either.

(5) In Provisional Publication No. Hei6-176047, the production control method and its equipment starts production control until it results [from an order received] in the completion of work, and is related with the production control method for grasping the load situation of each process, and equipment. However, this design does not perform man-hour control using an in-house intranet, either.

(6) Provisional Publication No. Hei 6-309327 includes a display method of the required man day in the operating remaining period and indicates by graph the required man day in the remaining period of business. This substitutes for a predetermined formula the actual result man day which is the work load actually spent by the time of there being business, and the rate of progress of the business of the time concerned, and indicates the required man day of the remaining period by calculation. However, this design does not perform man-hour control using an in-house intranet, either.

(7) Provisional Publication No. Hei 7-105275, discloses a capability distribution setting system which offers the interactive information system that attains the increase in efficiency of the business at the time of distributing equipment and a man to the production classification classified by the group, and the capability to perform capability distribution for every production classification is related with a strange report setting system, allowing reference excess and deficiency with a fiducial point for the fiducial point of capability, such as a man day and the number. However, this design does not perform man-hour control using in-house intranet, either.

(8) Provisional Publication No. Hei 9-248736 relates to a production planned planning equipment realizes highly precise scheduling in which the time necessary for completion/man day of an actual result base were made to reflect, and is related with the production planned planning equipment of which a foldout is easily made possible to a special case-situation at a schedule. However, this design does not perform man-hour control using in-house intranet, either.

Each above-mentioned inventions n are greatly different than the present invention. An in-house intranet is used in this invention, providing for managing a man-day using a paperless system. A man-hour control system like this invention does not exist until now.

SUMMARY OF THE INVENTION

The present invention includes apparatuses and methods that:

(1) Connect the administrator in many areas on-line in a paperless environment, and provide management and a related administrator with progress management information on business (a conformity standard, each process administrator, beforehand a fixed day, a completion date, quality record, etc.).

(2) Manage the business by using the minimum standard-lives system.

(3) Permit business management and ISO approval acquisition to be automatically compatible.

(4) Authorize the conformity standard beforehand with the general manager in charge according to the business, and reconcile improvement in the customer satisfaction in connection with the quality, including the time for delivery of goods and business, and operating efficiency.

(5) Ensure that performances reference the newest version of standards such that they can be carried out easily, and that business is ensured to be managed by the newest standard.

(6) Manage the quality and the time for delivery of business.

(7) Carry out unitary management on a network.

(8) Enable lower layer process deployment about each process.

There are the following in accord with other aspects of this invention.

(1) Unitary management of the human-resources information (for example, staff, composition, diligence and indolence, overtime work, subcontracting, etc.) may be carried out in a paperless and on-line environment, which provides a manager and other administrators with these newest information.

(2) An administrator may track the amount information of business (for example, an order-received plan, operating classification, an operating estimated man day, an actual result man day, etc.), and by offering the amount of undecided business very easily on-line [paperless] this permits the administrator to build databases, such as reading of the future, and management strategy, and aim at improvement in management power.

(3) For example, a [2 piece year] short-term fiscal year plan, top down instructions and bottom rise information, and offer year plan construction systems, such as a personnel secured design, are provided.

(4) Offer many informational inputs throughout the area and by many people, including, totals, and labels. Additionally, the ability to classify freely and to offer graphical analysis type displays of a man day, office hours, etc., according to various kinds of criteria, such as an operating exception, an operating kind exception, and an office-organization exception.

(5) Manage the newest data including the change history of a plan and an actual result, cooperate with other process management systems etc., and offer business management correspondence quickly.

(6) Set up the authority of operation, an input, and perusal and perform secret reservation, etc.

In order to solve the above-mentioned subject, this inventor constituted this invention as follows. Namely, one of the inventions of these classifies the combination and the flow of an operating process into two or more patterns as an operating classification beforehand. To do this, a series of operating processes is made to correspond to each operating classification, and the person in charge of each business enables it to choose out of this operating process.

The invention also includes a data preservation means to save a conformity standard with the above-mentioned person in charge, and the whole business is classified into two or more operating classifications. Also, an operating classification registration means by which a person in charge chooses the operating classification of the business for management from them, and determines and registers it, and each operating classification is received. Then, determine two or more management processes beforehand, and it has a management process display means to display this on a format in relation to the business for management. It has a means for a person in charge to determine a term and to display this on a format, for every management process. The business management system which has a conformity standard display means to display a conformity standard corresponding to each management process, and has a quality record registration means to record and display the quality performed about the management process is offered.

The business management system is exemplified as follows, i.e., this invention will display a conformity standard, a general manager in charge, and a person in charge, will draw up, correct and recognize the plan of the business for management, will attest execution, and will keep quality record. This invention may be described from the following aspects—namely:

(1) According to one aspect Am is classified as an operating classification. A1, A2, and . . . which are two or more patterns beforehand about the combination and the flow of an operating process A series of operating processes ai j (j=1–ni), which constitute each, to each operating classification Ai (i=1–m) is made to correspond. Furthermore, it enables it to divide these operating classification into some groups according to the contents of operating etc., and change, i.e., addition of contents, etc., can be made to do this group by expansion of business, namely:

$$\text{Total business} = \sum_{i=1}^{m} A_i + \sum_{i=1}^{k} B_i + \sum_{i=1}^{l} C_i + \ldots$$

$$A_i = \sum_{j=1}^{n_i} a_i j, \; B_i = \sum_{j=1}^{S_i} b_{ij}, \; C_i = \sum_{j=1}^{l_i} C_{ij}$$

It Am(s). And the general manager in charge of business—first—the group of operating classification, A1 and A2, and . . . Business classification B1, B-2, and . . . Bk, C1, C2, and . . . the nearest out of C1

For example, it enables one to choose Ai (the same, although Bi and Ci are chosen). Furthermore, it enable one to plan a series of persons in charge and schedules of the operating process aij (j=1–ni), which constitute Ai.

Furthermore, in this operating process aij, the person in charge of each operating process may choose a general manager in charge, and he has a data preservation means to save a general manager in charge and a person in charge, as well as a conformity standard.

(2) According to another aspect, it has an operating classification registration means by which a general manager in charge chooses the operating classification of the business for management from them, and determines and registers it.

(3) According to another aspect, the combination of all operating processes including two or more designs, manufacture, and management is beforehand determined to each operating classification, and further a management process display means is included to display this management process on a format.

(4) According to another aspect, a general manager in charge or a person in charge has a means to determine the term of the operating process aij and to display this on a format, for every management process.

(5) According to another aspect a conformity standard display means is included to display the conformity standard made to correspond to each management process.

(6) According to another aspect, the quality about each management process is displayed, and the business management system characterized by having each means of a quality record registration means to record it.

Preferably, a business management system is a business management system made to correspond to a demand of an ISO 9000 guarantee-of-quality standard. Moreover, it is the business management system, which makes the adaptation range of such standards correspond to the pattern of the management method beforehand based on the conformity standard, and makes the standard procedure correspond to a management process preferably.

Moreover, this invention preferably offers a business management system which has a network deployment means to develop the above-mentioned business management system on networks, such as the Internet or intranet. Moreover, the business management system enables deployment to the lower layer management process about the above-mentioned management process and which permits insertion of a management process, deletion, correction, and a move means.

Moreover, the business management system characterized by incorporating preferably software, which can display intranet and a table in a Web server, is offered. Moreover, one with this invention is the man-hour control system built by servers, such as document management in the homepage on networks, such as intranet and an in-house network.

Also, with regard to on-line-input somewhere in the company, the system enables others to peruse them, and the software in which a front display is possible is used. The input means and the output means permits input and output of data. A data item of an input means may include—schedule data and actual result data—g—and—as the data item of an output means—a product top man day, overtime work time, and the accumulated man days—the time—a display in series graph is possible—carrying out man-hour control, etc. Preferably, the above-mentioned input means can reexamine, correct and input the plan of the part in two or more fiscal years at the beginning of every month henceforth as schedule data at a beginning of period, and the system which a schedule/actual result data item can input data, such as a staff, annual-paid-holidays acquisition, indirect time, and in-house man day and a subcontract man day, and can perform the graph display of the man day received an order and an undecided man day to a target man day is offered.

Moreover, the input of each above-mentioned data offers those (for example, group manager) to whom authority was given, or the system made into the consignment person the ability to view and analyze the data. Furthermore, the summary sheet of the above-mentioned output means offers the system whose display of an in-house man day and a subcontract man day is enabled according to an operating classification or an order-received form a project exception (a project number and product exception, project name) and an office-organization exception (according to a part, a section, an operation division, and company). Furthermore, the system may limit perusal authority only to ID registrant.

And the system may also be characterized by being another WEB server and database which the document managed software which moves on the above-mentioned network again connects to the document managed software with an attestation function or it which moves on intranet.

DETAILED DESCRIPTION OF EXEMPLARY EMBODIMENTS OF THE INVENTION

In the invention, it shall be understood that the term "business" is to be used in a wide sense including the quality of the business or project, schedule management of the business, etc. Further, a man-day or artificiality in a wide sense including artificial numbers, such as staff X days. Especially the term "person in charge's as used herein means the person in charge who takes charge of the process or who manages operating at large.

The conformity standard used by this invention may include, among other things, a standard in the company, a quality manual, the standard for an operating division, the standard of a part, a group standard, a procedure document, a manual, etc. include international and standards, regulations, provisions of a contract and a customer demand, external regulations, a JIS, etc.

The quality record used by this invention expresses the result of execution of each process, and may include an arrangement record, a drawing, a list, inspection data, etc. Hardware included in the invention may conform to the TCP/IP protocol and used without restriction. Software used in the present invention may determine data for and display tables used by this invention, and is used without restriction. For example, browsers, such as commercial spreadsheet software and Netscape, can be used. The Internet and intranet can be used as a network used by this invention.

The system of this invention, in exemplary embodiments, includes servers, such as a document management server and intranet and/or in-house networks. And it is another WEB server and database which the document managed software which moves on the above-mentioned network again connects to the document managed software with an attestation function or it which moves on intranet preferably.

In this invention, as an example, information is assembled on a Web server with intranet software, and it is constituted so that it may transmit to a terminal. Namely, for example:
  (1) Give a Demand from a Terminal to a Web Server.
  (2) Retrieve Information from the Server according to the Demand.
  (3) Return the Contents of information to Terminal.
  (4) Display at a terminal with the software the contents of the information, for example, in the form of a table.

Of course, it is possible to also make it operate as another system in this invention combining software that can display intranet software and a table in a Web server. In the company and external somewhere can also be on-line-inputted, and this system can peruse them, as long as the network is being installed. In the business management system which displays conformity standards, such as a standard-lives system, attests execution of business, and keeps quality record of execution record etc.

First, each business for management is decomposed into the combination of the management process of a plurality (A pieces). As for A, reducing the number of pieces as much as possible is desirable. Regarding each management process, quality standards, such as the ISO 9000 standard may be specified. Further, all business is arranged in the operating classification of the small number (B pieces) which consists of the part or all the combination of the A above-mentioned management processes. As for B, reducing the number of pieces as much as possible is desirable. Moreover, a general manager in charge may choose the nearest thing from the B above-mentioned operating classification according to an order-received form, delivery of goods, an operating form, etc.

In the start of business, a general manager in charge registers with a ledger, fills in a completion date etc., first, and then fills in an actual result, etc., at the time of completion. In a ledger, a fixed day, a completion date, etc., can be looked through beforehand and progress of all business can be surveyed. Access to the ledger may be limited to a person with specific authority, and security can also be implemented.

A management process can be displayed as a line (sequence), and the addition of the line (sequence) and deletion create the B above-mentioned operating methods using the function of the software (for example, spreadsheet software), which can display the information in table form, and they are registered as a format (henceforth a PMS format) of this invention system.

When the business management system (PMS) of this invention is carried out by the above composition, a conformity standard is displayed, execution of business is attested to, and attestation acquisition of the ISO 9000 guarantee-of-quality standard of requiring that quality records should be kept is attained. This is performed in the embodiment as a paperless system.

It is desirable in a PMS format to have structure which can be expanded and contracted using the total function which can display a table and which is equipped with software that sets up the generalization screen in the state where it contracted, and the deployment screen in the state where it was extended, and it has structure which can be perused. And the progress situation of the business concerned can be easily understood.

On a deployment screen, the addition of a process line, deletion, the deployment to a detailed process, etc., can be copied with flexibly. In this invention, it is possible to incorporate software that can display in an intranet environment and a table in a Web server.

As a data item of an input means to be used by this invention, there may be schedule data and actual result data, for example. As a data item of an output means to be used by this invention, a product top man-day, overtime work time, and accumulation of man-days may be included, for example. Setting and displaying of the data item of output, such as a time series graph is possible by this invention.

Preferably, the above-mentioned input means can reexamine, correct, and input the plan in two or more fiscal years at the beginning of every month as schedule data at a beginning of period. And data, such as staff data, annual-paid-holidays acquisition, indirect time, and in-house man days and subcontract man days, can be inputted as a schedule/an actual result data item.

In this invention, the graph display of the man-day received, an order and undecided man-day to a target man-day can be performed as a data item of the above-mentioned output means.

Furthermore, in this invention, the summary sheet of the above-mentioned output means can display an in-house man-day and a subcontract man-day according to operating classification or an order-received form a project exception (a project number and product exception, project name) and an office-organization exception (according to a part, a section, an operation division, and company). In this invention, the total value or table of the above-mentioned output means may coordinate with other document managed software, for example, an operating process, a schedule management table, etc., and can display the same. In this system, since document managed software with an attestation function is used, the input of each above-mentioned data be those (for example, group manager) to whom authority was given, or its consignment person. Furthermore, perusal authority is limited only to an ID registrant.

EXAMPLES

The examples of the business management system of this invention are explained in detail below. These cases of the operation are examples, but may also include, for example, management of contractors. In the examples the network used the TCP/IP protocol, and the Web server was constituted from Windows NT™, and the terminal was moved by Windows 95™ The Frame Relay of NTT was used as the communication method.

Example 1

Figure 1:
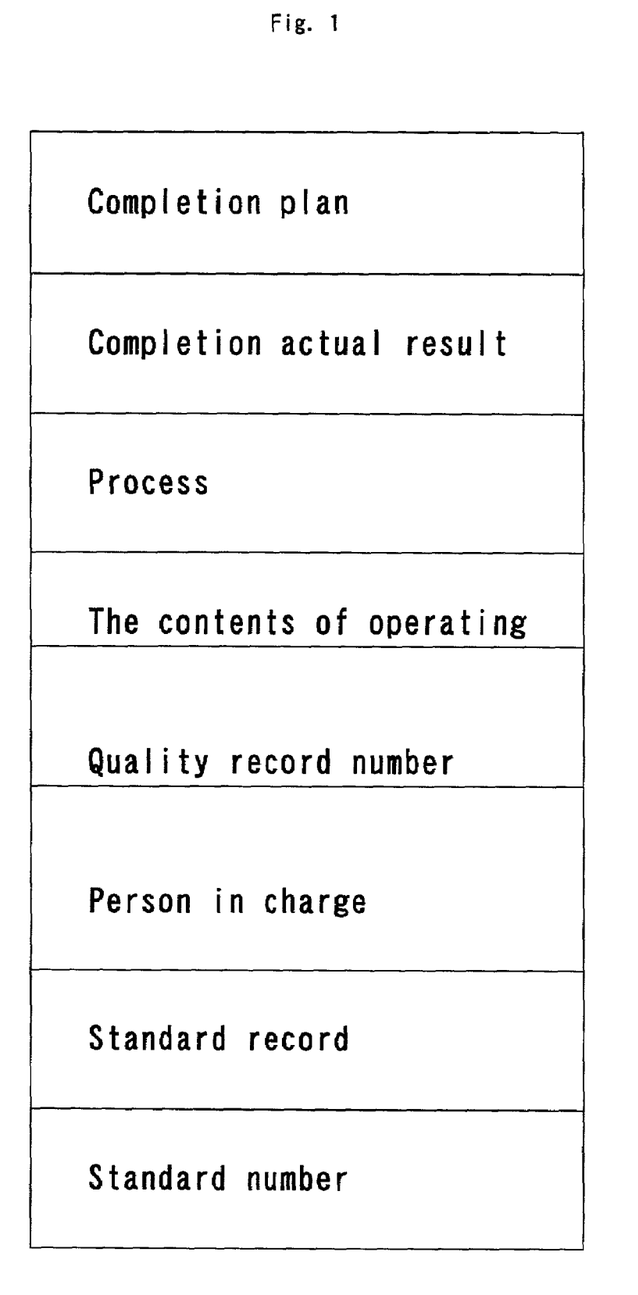
FIG. 1 shows the file composition of a business management system (PMS), according to an exemplary embodiment of the invention.

The business management system (PMS) data structure of a business management system (PMS) according to the invention is shown in FIG. 1. Data of this embodiment may consist of title column data and contents column data of operating data.

Title column data consists of the nine following kinds of data.

(1) "A section" The words and phrases which express office organization for the affiliation section of the general manager in charge of the business concerned is inputted.

(2) "A general manager in charge" Words and phrases, such as position and rank which discriminate the general manager in charge of the business concerned, are inputted.

(3) "A management number" It registers by the ledger function which may contain a number for management (whole company unitary management is possible) of the business concerned in this system, and the number (identification number) is inputted.

(4) "A creation day" The creation day of the PMS table concerned is inputted by the date.

(5) "Delivery of goods" Words and phrases supplied to the operating enforcement result concerned, a customer, etc., such as goods and an operating result, are inputted.

(6) "0 mark at the time of completion" When the business concerned is completed, marks (0 mark etc.) are inputted for discernment.

(7) "The comment column" When there is a process which requires deletion, an addition, change, etc. by the contract with a customer etc., in a setup of the process of the business concerned, the words and phrases of the explanation are inputted.

(8) It has the authority filled in as the date which filled in (9) "date entry person" The name of the person who entered the data, and the words and phrases of discernment are inputted.

The contents data may consist of the eight following kinds of data.

(1) "A completion plan" The plan value of the completing date of the process concerned is inputted by the date.

(2) "A completion actual result" The actual result value of the completing date of the process concerned is inputted by the date.

(3) "The contents of operating" The words and phrases which show the contents of operating of the process concerned are inputted.

(4) "A quality record number" The number of a quality record of the process concerned is inputted.

(5) "A person in charge" A person's in charge name or executive name of the process concerned is inputted.

(6) "A standard name" The conformity standard name of the process concerned is inputted.

(7) "A standard number" The conformity standard number of the process concerned is inputted.

Example 2

The flowchart of the system of the business management system (PMS), which is one case of the operation of two cases-of-the-operation inventions.

Table I below specifies the operation authority person for every classification, and those who can be perused.

| Classification | | Operation authority person (Creation, change, registration, acquisition, perusal) | Those who can be perused (A copy acquisition person also contains) | Note |
|---|---|---|---|---|
| PMS table ledger | | Generalization person in charge | More than a chief | Notes A |
| PMS table Common format | | Generalization person in charge | Employee all the members | Generalization person in charge is more than the manager, |
| PMS table Operation | Creation, change | Generalization person in charge | Selection of only a specific user is possible more than a chief. | |
| | Middle record | The operation division concerned and more than the group manager of a branch office | | |
| | Change, disposal | The operation division concerned and more than the group manager of a branch office | | |
| | Completion disposal | Generalization person in charge | | |

| PMS table filing | PMS table filing | Or Generalization person in charge | Selection of only a specific user is possible more than a chief. |
|---|---|---|---|
| | Move area | Generalization person in charge | |

Example 3

Figure 2:
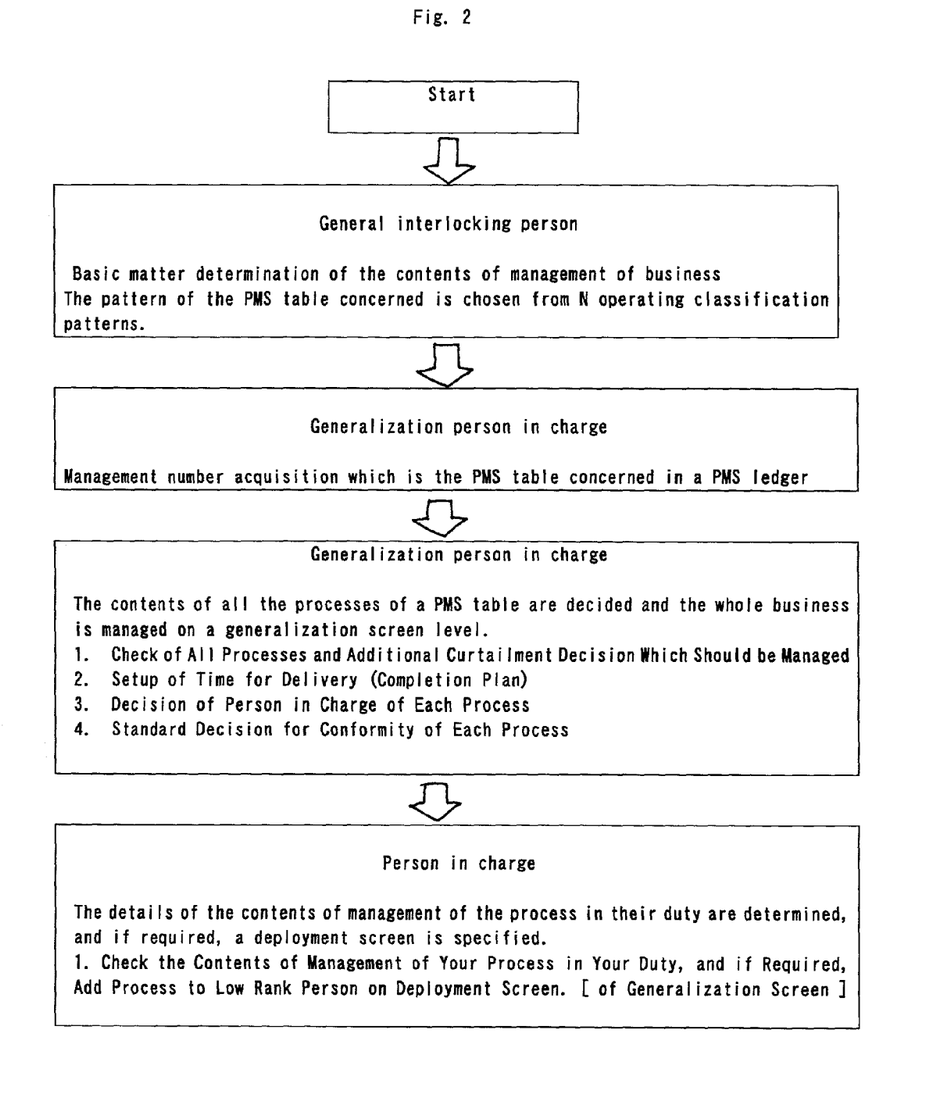
FIG. 2 shows the operation procedure of the business management system (PMS) according to an exemplary embodiment of the invention.

The operation procedure for categorizing and initiating the business management system (PMS) is explained referring to FIG. 2.

1. Start

2. Determine the basic matter of the contents of management of business. In this case, one pattern is chosen from N pieces of operating classification patterns.

3. A general manager in charge acquires a management number in a ledger.

4. A general manager in charge decides the contents of all management processes, and manages the whole business on a screen level.

(a) Decide the check of all the processes that should be managed, an addition, and deletion according to each business.

(b) Set up time for delivery (completion time).

(c) Decide the conformity standard of each process.

5. A person in charge determines the details of the contents of management of the process in his duty.

A deployment screen will be specified if required. If the contents of management of their process in their duty are checked and required on a generalized screen, a process will be added.

Example 4

The Starting Method of the System of the Case of the Operation (PMS)

Figure 3:
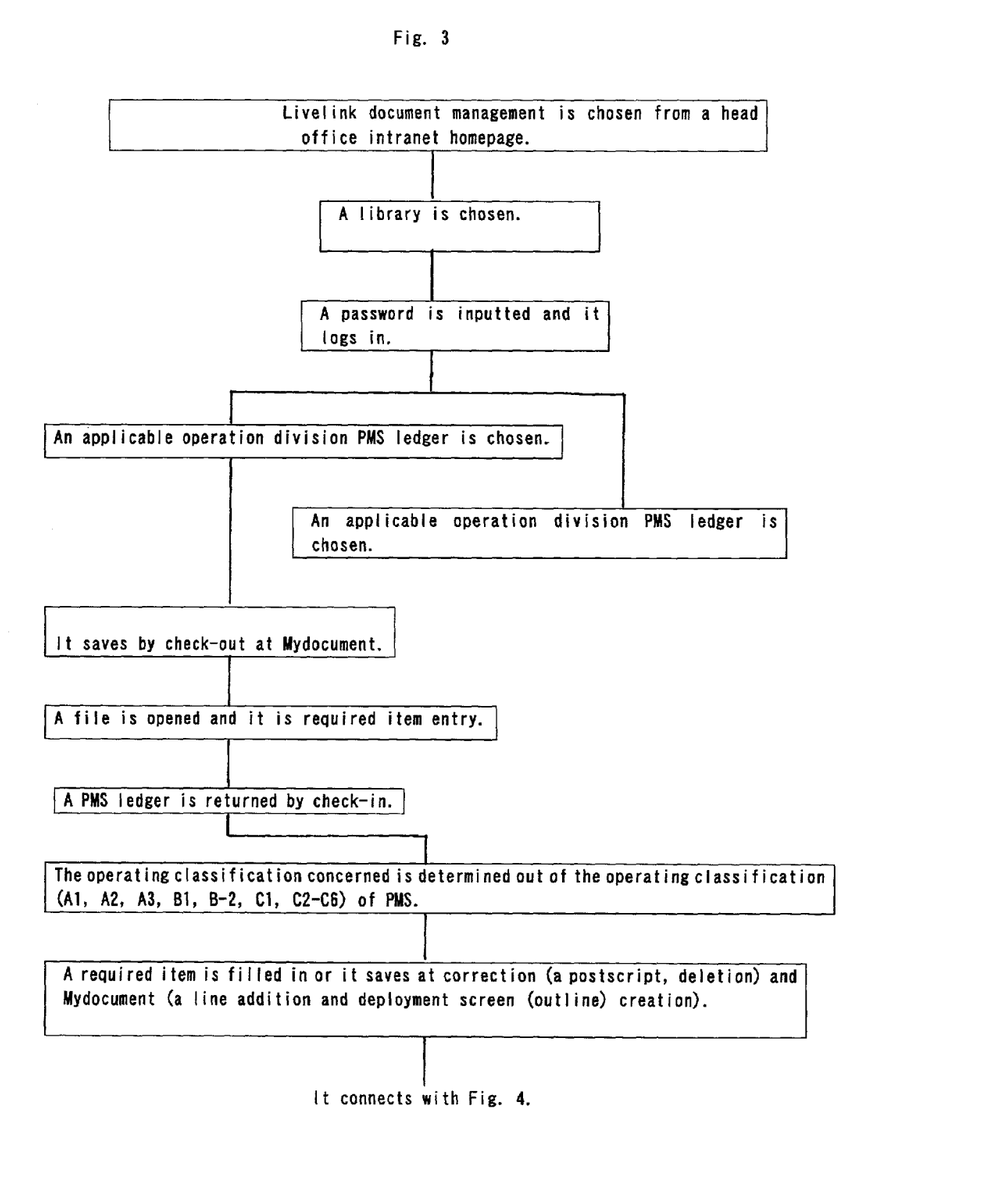
FIG. 3 explains the operation method of the business management system (PMS) according to an exemplary embodiment of the invention.
Figure 4:
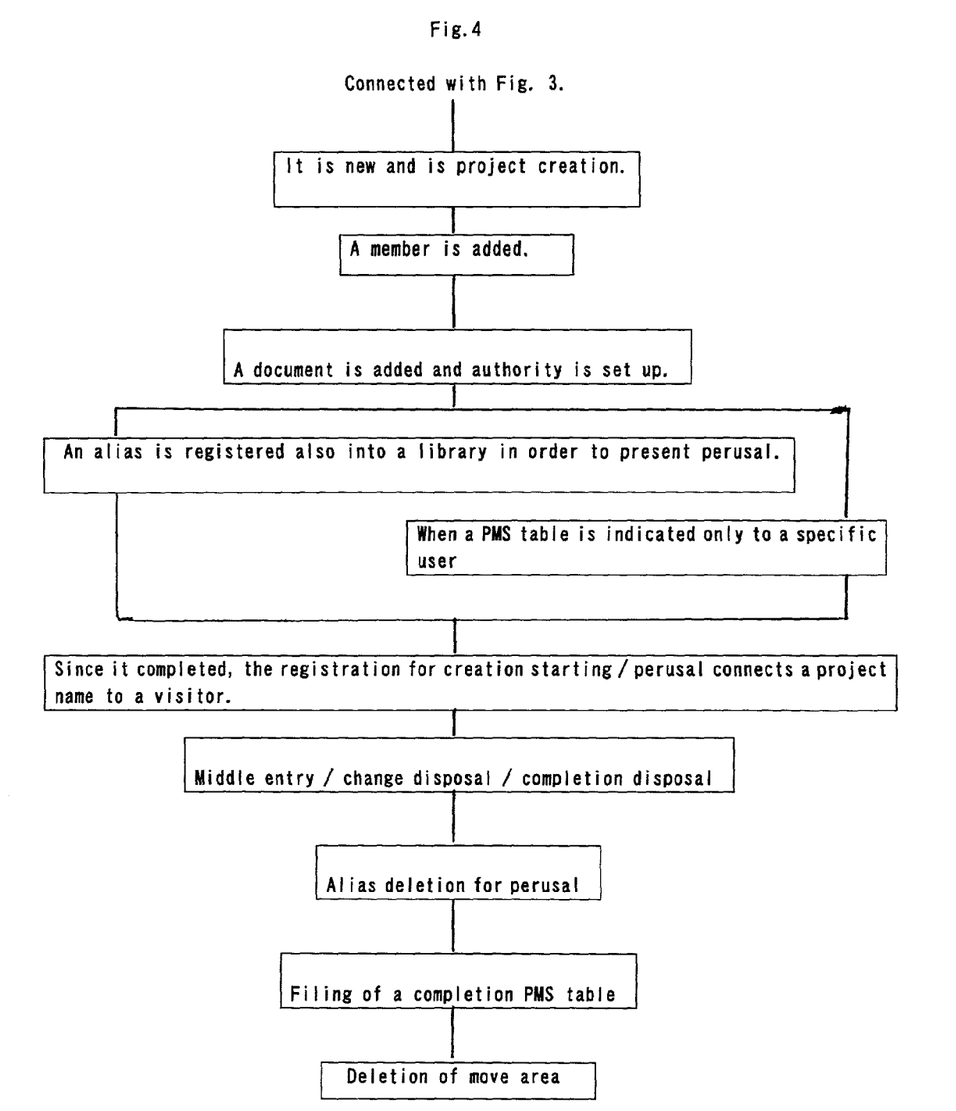
FIG. 4 explains the operation method of the business management system (PMS) according to an exemplary embodiment of the invention.

The starting method of the case of the operation of this system is explained referring to FIG. 3. This case of the operation is an example of operation at the time of using live link™ as intranet software.

1. "Document management" of live link™ is chosen from a head office intranet homepage.

2. Next, a library is chosen and password inputted.

3. A general manager in charge chooses an applicable operation division PMS ledger.

4. The information is saved on a local disk (My documents) by checkout.

5. A file is opened and required matters are filled-in, such as a name, a creation day, position and rank, and a completion plan.

6. The PMS format is chosen corresponding to the operating classification determined by 3.

7. A required matter is filled-in and then the information may be saved on a local disk (My documents).

8. Other members may be added.

9. Add a document and set up authority.

10. In order to present perusal, an alias may be registered into a library. When carrying out to the ability only of a specific user to be perused, a PMS table is indicated only to a specific user. And since it completed, creation starting/perusal registration connects a project name to a related person.

11. Perform middle entry, change disposal, and completion disposal.

12. Filing of a PMS table (it changes for the alias for perusal).

13. Only in perusal, open the alias for perusal.

Example 5

Addition of Lines, and Deployment Screen (Outline) Creation

This case of the operation is an example of operation at the time of using Excel™ as software, which can display a table. For example, when adding one line to the 13th line, (1) left end No. 13 are clicked and (2) [insertion]-[line] is chosen. The contents of operating, etc., are copied or inputted and are created suitably. In line deletion, [edit]-[deletion] is chosen after clicking No. to delete. No. which the above-mentioned operation was repeated twice in creation of a deployment screen, and was added two lines—let 13 and 14 be the deployment screens of No. 12 In this case, (1) No.—13 and 14—dragging—(2) [data]-[setting of group and outline]-[group-ization] is chosen (3) The Deployment Method:

1. When all the outlines set as the worksheet are developed:

(a) A click of Level Number 1 Displays "Generalization Screen."

(b) A click of the level number 2 displays a "deployment screen."

2. When Only Target Group is developed,

(A) A click of Minus at the left end of the Target No (−) Folds Up Line.

(B) A click of plus (+) develops a line conversely. The example operated combining software both which can display intranet software and a table in case-of-the-operation 6 Web server.

Example 6

It is made to operate combining software which can display intranet software and a table in a Web server by performing the previous examples continuously.

Example 7

Figure 5:
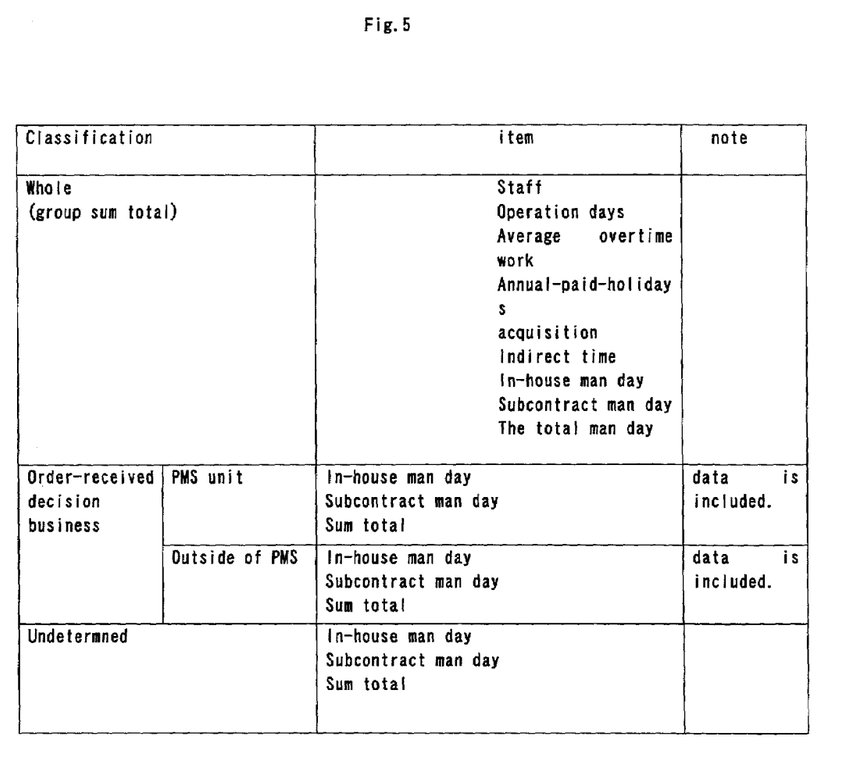
FIG. 5 depicts the data structure of the man-hour control system (PMS), according to an exemplary embodiment of the invention.

The data structure of PMR is shown in data structure of FIG. 5 of the man-hour control system (PMR), (1) In the case of "the whole (group sum total)", it is days about "staff" (the change in the middle of possession number and month-long is inputted by operating days ratio) "operation days" (days of the operation to monthly) "annual-paid-holidays acquisition": annual paid holidays, and a schedule/actual result inputs each item of "indirect time" (what is not direct operating time, such as education) according to each group.

In addition, only a schedule inputs all the possession man days that the overtime work time which averaged "average overtime work" to per person, and the "total man day" want to work also including in the company and outside intentionally. The schedule or actual result of the actual result of "average overtime work" and the "total man day", an "in-house man day", and a "subcontract man day" is automatically totaled from other items.

(2) Although each order-received business number and manages the number concerning management systems (hereafter referred to as PMS.), such as a special operating process and a schedule, in "order-received decision operating", a schedule/actual result inputs necessary "in-house man day" and a "subcontract man day" for every unit of each. In the case of the business when not setting up the above-mentioned PMS number, it inputs as "outside of PMS" similarly. Each business inputs "operating classification data", such as a technical individual or a design contract. The sum total of an in-house man-day and a subcontract automatically.

(3) The case of undecided part "a total man day" undecided with a difference with a "order-received decision man day"—apart—a schedule value is automatically totaled for an "in-house man day" and a "subcontract man day"

Figure 6:
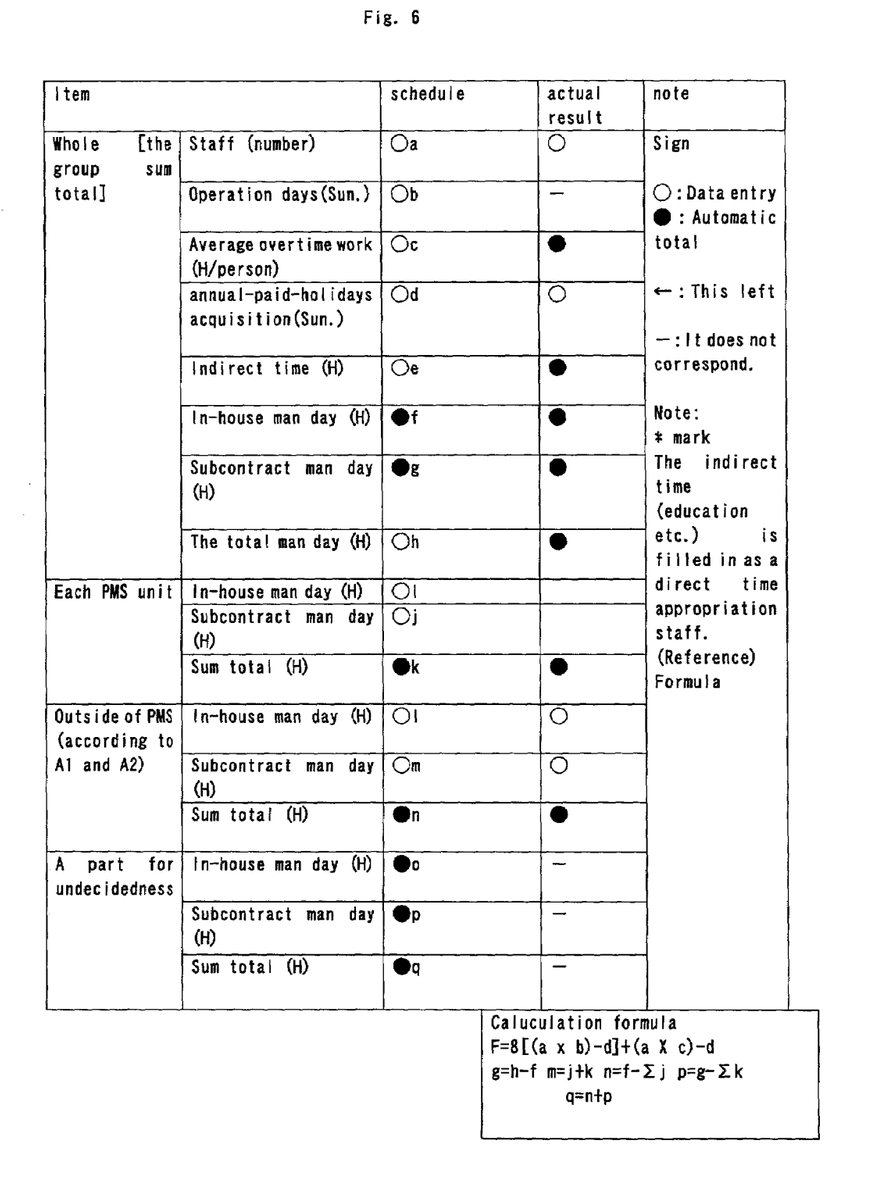
FIG. 6 depicts a case of operation showing the formula of f, g, m, n, p, and q which are an automatic total item.
Figure 7:
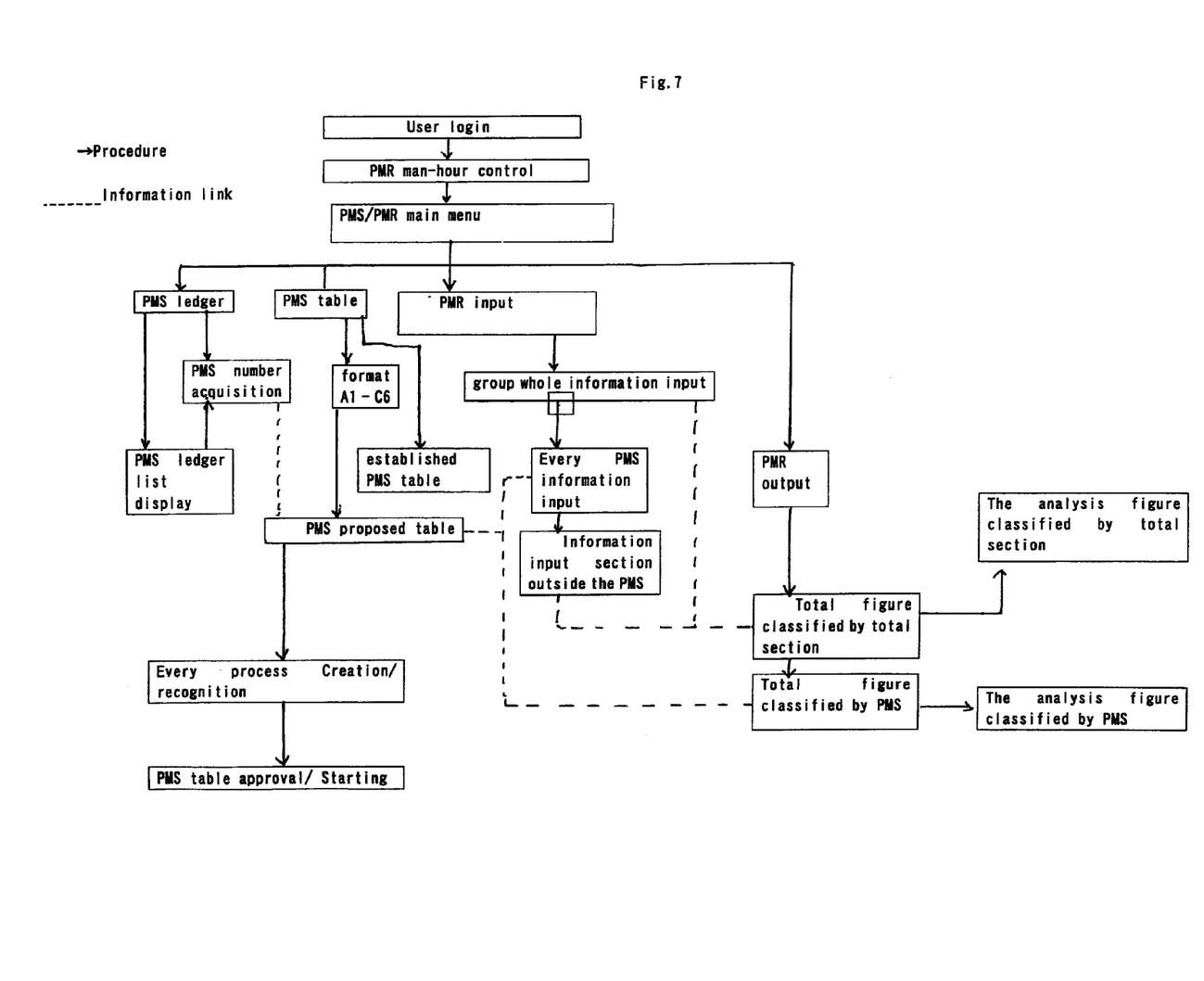
FIG. 7 is a flow chart of the man-hour control system (PMR) according to an exemplary embodiment of the invention.

Next, to each item of FIG. 6, O displays an input item, it displays an automatic total item by a darkened O, and FIG. 7 shows the formula of f, g, m, n, p, and q, which are an automatic total item as reference.

Example 8

Flow Chart of PMR and PMS

FIG. 7 is the flow chart of PMR and PMS.

(1) First, a user inputs a password and logs in.

(2) Next, PMR man-hour control is chosen.

(3) "PMR input" or "PMR output" of the screen of a PMS/PMR main menu is chosen.

(4) Next, specify or select, an open an "information input", a "summary sheet", or an "analysis figure", and input-operate it or a necessary group etc. peruses office organization, operating classification, a PMS number, etc. (5) Moreover, the PMS table of relation and PMS ledger from a PMS/PMR main menu also entering—supposes that it is possible

Example 9

PMR Analysis Figure

Figure 8:
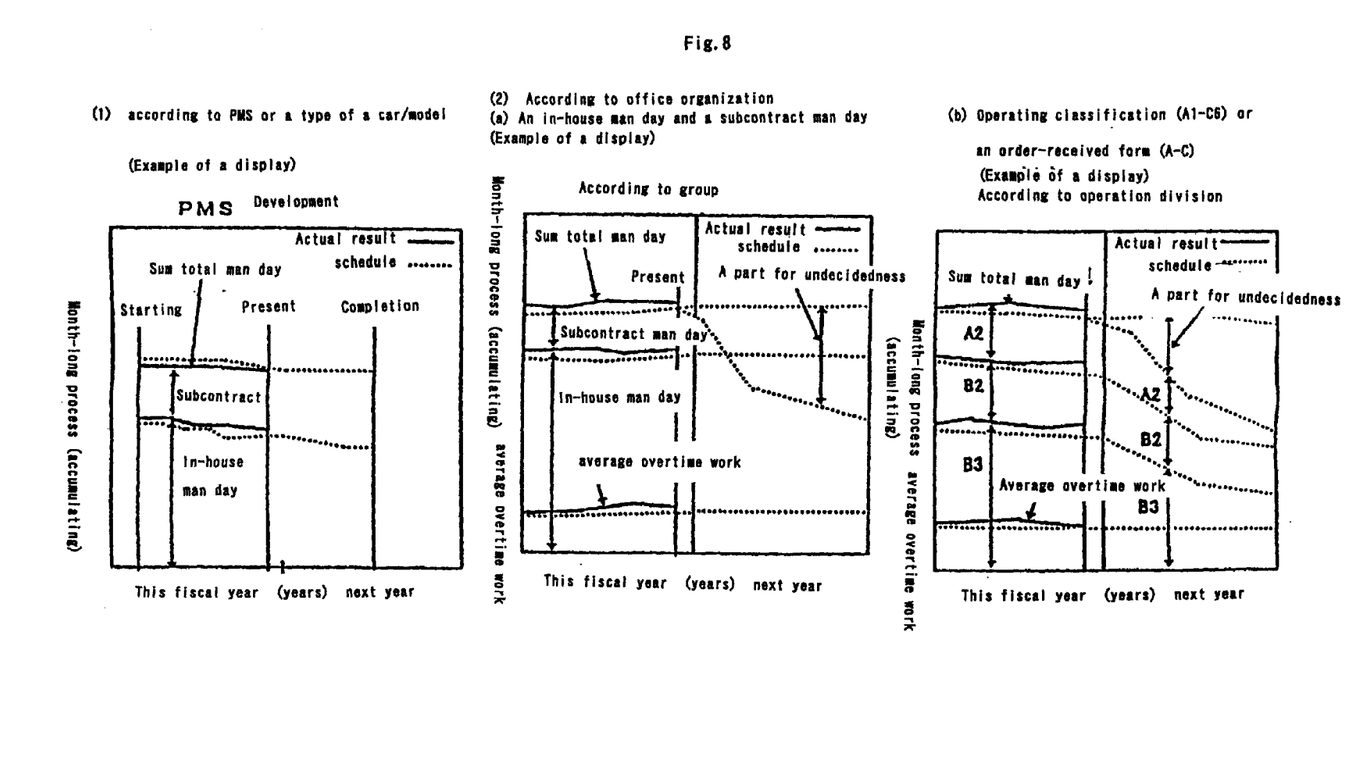
FIG. 8 is an analysis figure of the man-hour control system (PMR) according to an exemplary embodiment of the invention.

The analysis figure of PMR is displayed in FIG. 8.

(1) "PMS development"—starting of the project to completion—the time—a series horizontal axis—carrying out—a schedule man day (in the company, subcontract)—the actual result man day to this time—having displayed—a thing.

(2) "According to group", a displays a schedule man day (part in 2 fiscal year), and average overtime work time, in the actual result to this time, and future undecided part.

(3) "According to operation division" displays the above classified thing, where the operating classification and order-received form are displayed.

EFFECT OF INVENTION

The effect of the present invention includes the follow advantages over the related art.

(1) The administrator in many areas is connected on-line [a paperless sytem], and management and a related administrator can be provided with the progress management information on business (a conformity standard, each process administrator, beforehand a fixed day, a completion date, quality record, etc.).

(2) Much business is manageable by the minimum standard-lives system. Moreover, since the relation between standards can be grasped easily, a standard can be optimized.

(3) The format is manageable in creation of verification demanded by the customer and the ISO 9000 guarantee-of-quality standard, and quality records, storage and progress of business, and time for delivery by preparing the entry column of a general manager in charge, each person-in-charge name, a conformity standard, an execution record number, and a completion plan and an actual result, and being able to do and perusal and writing entering a conformity standard and an execution record format to a format by intranet, on the same software, which makes a paperless possible.

(4) Business management by the newest standard can be performed.

(5) The quality and the time for delivery of business are manageable.

(6) Unitary management can be carried out on a network. A possibility that an old standard may be used may be prevented.

(7) Since a list indication of the term of each process is given in the schedule management display of this invention, the inconsistency in the schedule of each process can be discovered at a glance, and is, thus, useful for business management.

(8) Correction is easy, when a problem is discovered by the contents of each process and the schedule management display of this invention takes change, appropriate corrections may be made since creation of a deployment screen is easy.

(9) It is possible to set up each schedule management by the schedule management display of this invention, referring to the whole schedule management, since the mutual deployment to a deployment screen from a generalization screen is easy.

(10) Since there is a general manager in charge, the person in charge of each process, a conformity standard, execution record, entry of a date, and the display column in the PMS format of this invention, standardization of business and clarification of responsibility authority are made possible.

(11) In the PMS format of this invention, during the last completion actual result days in case two or more administrators perform the process of a same name, un-starting [of a certain process], advancement, and the state of completion can be expressed as a color and it is help [management].

Another embodiment of the invention has the following effect.

(1) Since unitary management of the human-resources information (for example, a staff, composition, diligence and indolence, overtime work, a subcontract, etc.) was carried out paperless and on-line, a manager and many administrators can always be provided with the newest information.

(2) The amount information of business (for example, an order-received plan, operating classification, an operating estimated man day, an actual result man day, etc.,) may be easily evaulated—since especially the amount of undecided business is offered very easily on-line [a paperless system], and, thus, an administrator may more efficiently access databases, such as reading of the future and management strategy. Therefore, an improvement in management power can be aimed at.

(3) Since an administrator can be provided with the manpower information (they are a plan and an actual result especially) on proper distribution (correspondence to an excess-and-deficiency staff and the amount of excess-and-deficiency business) of the human resources to the amount of business, i.e., each operating project, and each of its process level, deliberations, such as equalization, increase in efficiency, etc., between administrators, a management disposal system can be offered.

(4) For example, the top of an about [2 piece year] short-term fiscal year plan, the down (instructions), and the bottom rise information can be disclosed, and year Plan construction systems, such as a personnel secured design, can be offered.

(5) Offer many information inputs by the area and a lot of people, totals, and labels.

(6) It can classify free and the analysis figure display of a man day, office hours, etc. can be offered according to various kinds of criteria, such as an operating exception, an operating kind exception, and an office-organization exception.

(7) The newest data including the change history of a plan and an actual result is managed, it coordinates with other process management systems etc., and business management correspondence can be offered quickly.

(8) The authority of operation, an input, and perusal can be set up and secret reservation can be performed.

What is claimed is:

1. A process for work management comprising:
determining a conformity standard for the work to be managed;
selecting a managing method of the work to be managed from among a plurality of managing methods classified in advance based on the conformity standard;
breaking down the work into a plurality of activities;
monitoring a quality of performance for each of the activities; and
means for determining operating classification used by the management system, the operating classification, A1, A2, and . . . which are two or more patterns determined beforehand about a combination flow of an operating process, a series of operating processes aij (j=1–ni), which constitute each, to each operating classification Ai (i=1–m) is made to correspond, where all activities are defined by:

$$\sum_{i=1}^{m} A_i + \sum_{i=1}^{k} B_i + \sum_{i=1}^{l} C_i + \ldots$$

$$A_i = \sum_{j=1}^{ni} a_i j, B_i = \sum_{j=1}^{Si} b_{ij}, C_i = \sum_{j=1}^{li} C_{ij}.$$

2. The process for work management according to claim 1, further comprising displaying at least one of:
    (a) work progress;
    (b) a schedule for each activity; and
    (c) quality performance for at least one of the entire work and each of the activities.

3. The process for work management according to claim 1, wherein the quality of performance for the activities is recorded.

4. The process for work management according to claim 1, wherein the process is deployed over a network.

5. The process for work management according to claim 1, wherein the process is performed by software operable to display data tables in a Web server.

6. The process for work management according to claim 1, wherein the process is deployed over at least one of an intranet or the Internet.

7. The process for work management according to claim 1, further comprising determining and at least one of recording and displaying information on an in-house man day and a subcontract man day.

8. The process for work management according to claim 1, further including controlling access to the determining, selecting, and monitoring.

9. A business management system comprising:
data storing means for storing information on an authorized person in charge and a conformity standard for work to be managed;
work registering means by which the authorized person in charge selects a managing method of the work to be managed from among a plurality of managing methods classified in advance;
management process display means for displaying managed processes determined for each management method;

time limit display means for displaying a time limit determined by the authorized person in charge for each managed process;

adherence standard display means for displaying adherence standards related to the managed processes;

quality standard means for displaying a quality of performance for each managed process;

recording means for recording system data; and means for determining operating classification used by the management system, the operating classification, A1, A2, and . . . which are two or more patterns determined beforehand about a combination flow of an operating process, a series of operating processes aij (j=1–ni), which constitute each, to each operating classification Ai (i=1–m) is made to correspond, where all activities are defined by:

$$\sum_{i=1}^{m} A_i + \sum_{i=1}^{k} B_i + \sum_{i=1}^{l} C_i + \ldots$$

$$A_i = \sum_{j=1}^{ni} a_i j, \; B_i = \sum_{j=1}^{Si} b_{ij}, \; C_i = \sum_{j=1}^{ti} C_{ij}.$$

10. The business management system according to claim 9, wherein the managed processes conform to a quality standard.

11. The business management system according to claim 10, wherein the quality standard is at least one of the ISO 9000 standards.

* * * * *